United States Patent
Moreira de Carvalho et al.

(10) Patent No.: US 10,382,921 B2
(45) Date of Patent: Aug. 13, 2019

(54) SYSTEMS AND METHODS FOR IN-VEHICLE SENSING USING A CAPTIVE PORTAL WITH SMART PHONE DATA COLLECTION IN THE CONTEXT OF A NETWORK OF MOVING THINGS

(71) Applicant: Veniam, Inc., Mountain View, CA (US)

(72) Inventors: Luís Miguel Moreira de Carvalho, Astromil (PT); Rui Miguel Correia e Costa, Sintra (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 16/048,565

(22) Filed: Jul. 30, 2018

(65) Prior Publication Data

US 2019/0090109 A1    Mar. 21, 2019

Related U.S. Application Data

(60) Provisional application No. 62/559,206, filed on Sep. 15, 2017.

(51) Int. Cl.
*H04W 4/02* (2018.01)
*H04W 4/50* (2018.01)
*H04W 4/021* (2018.01)
*H04W 4/38* (2018.01)
*H04W 12/08* (2009.01)
*H04W 84/12* (2009.01)

(52) U.S. Cl.
CPC .......... *H04W 4/50* (2018.02); *H04W 4/021* (2013.01); *H04W 4/38* (2018.02); *H04W 12/08* (2013.01); *H04W 84/12* (2013.01)

(58) Field of Classification Search
CPC ... H04W 4/021; H04W 4/50; G06F 17/30604; G06F 21/6254; H04L 67/32; H04L 67/02; H04L 67/42; H04L 67/12; H04N 5/77; H04N 7/181; H04N 5/232
USPC ................ 709/219; 726/4; 701/1; 455/414.1
See application file for complete search history.

(56) References Cited

U.S. PATENT DOCUMENTS

| | | | |
|---|---|---|---|
| 8,924,459 | B2 | 12/2014 | Gagne et al. |
| 9,521,606 | B1 | 12/2016 | Costa et al. |
| 9,713,063 | B2 | 7/2017 | Costa et al. |
| 2003/0078053 | A1 | 4/2003 | Abtin et al. |
| 2006/0002326 | A1 | 1/2006 | Vesuna |
| 2006/0031436 | A1 | 2/2006 | Sakata et al. |

(Continued)

OTHER PUBLICATIONS

Int'l Search Report and Written Opinion for Appln No. PCT/US2016/052920 dated Dec. 8, 2016, 14 pages.

*Primary Examiner* — Phuoc H Doan
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). In particular, methods and systems for in-vehicle sensing using a captive portal that collects sensor data samples from sensor devices in electronic devices of end-users.

24 Claims, 11 Drawing Sheets

(56) References Cited

U.S. PATENT DOCUMENTS

| | | |
|---|---|---|
| 2011/0082916 A1* | 4/2011 | Swanson .............. H04L 45/125 |
| | | 709/219 |
| 2011/0173682 A1 | 7/2011 | Perry et al. |
| 2011/0307119 A1 | 12/2011 | Basir et al. |
| 2012/0170521 A1 | 7/2012 | Vogedes et al. |
| 2012/0240197 A1 | 9/2012 | Tran et al. |
| 2013/0022031 A1 | 1/2013 | Sivertsen |
| 2013/0145065 A1 | 6/2013 | Ricci et al. |
| 2014/0040016 A1 | 2/2014 | Amla et al. |
| 2014/0189838 A1 | 7/2014 | Zhao et al. |
| 2014/0335897 A1 | 11/2014 | Clem et al. |
| 2015/0142947 A1 | 5/2015 | Dyba et al. |
| 2015/0142980 A1 | 5/2015 | Bragg et al. |
| 2015/0201438 A1 | 7/2015 | Adarapu et al. |
| 2017/0034470 A1* | 2/2017 | Kleinrock .............. H04L 67/12 |

* cited by examiner

SYSTEMS AND METHODS FOR IN-VEHICLE SENSING USING A CAPTIVE PORTAL WITH SMART PHONE DATA COLLECTION IN THE CONTEXT OF A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/559,206, filed on Sep. 15, 2017, and titled "Systems and Methods for In-Vehicle Sensing Using Captive Portal with Smart Phone Data Collection in the Context of a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/299,269, titled "Systems and Methods for Automating and Easing the Installation and Setup of the Infrastructure Supporting a Network of Moving Things," filed on Feb. 24, 2016; and U.S. Provisional Application Ser. No. 62/430,634, titled "Systems and Methods for Self and Automated Management of Certificates in a Network of Moving Things, for Example Including a Network of Autonomous Vehicles," filed on Dec. 6, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
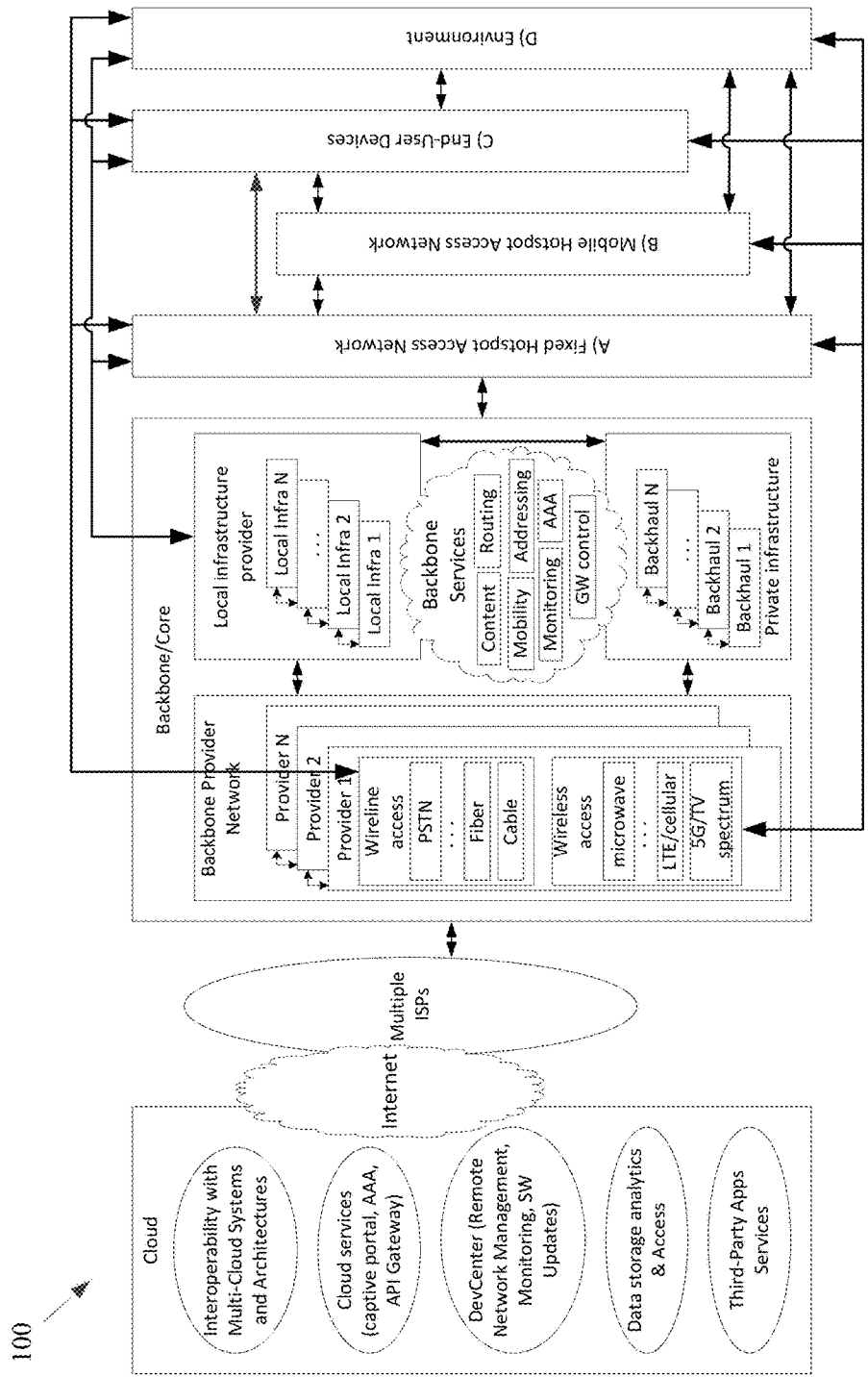
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
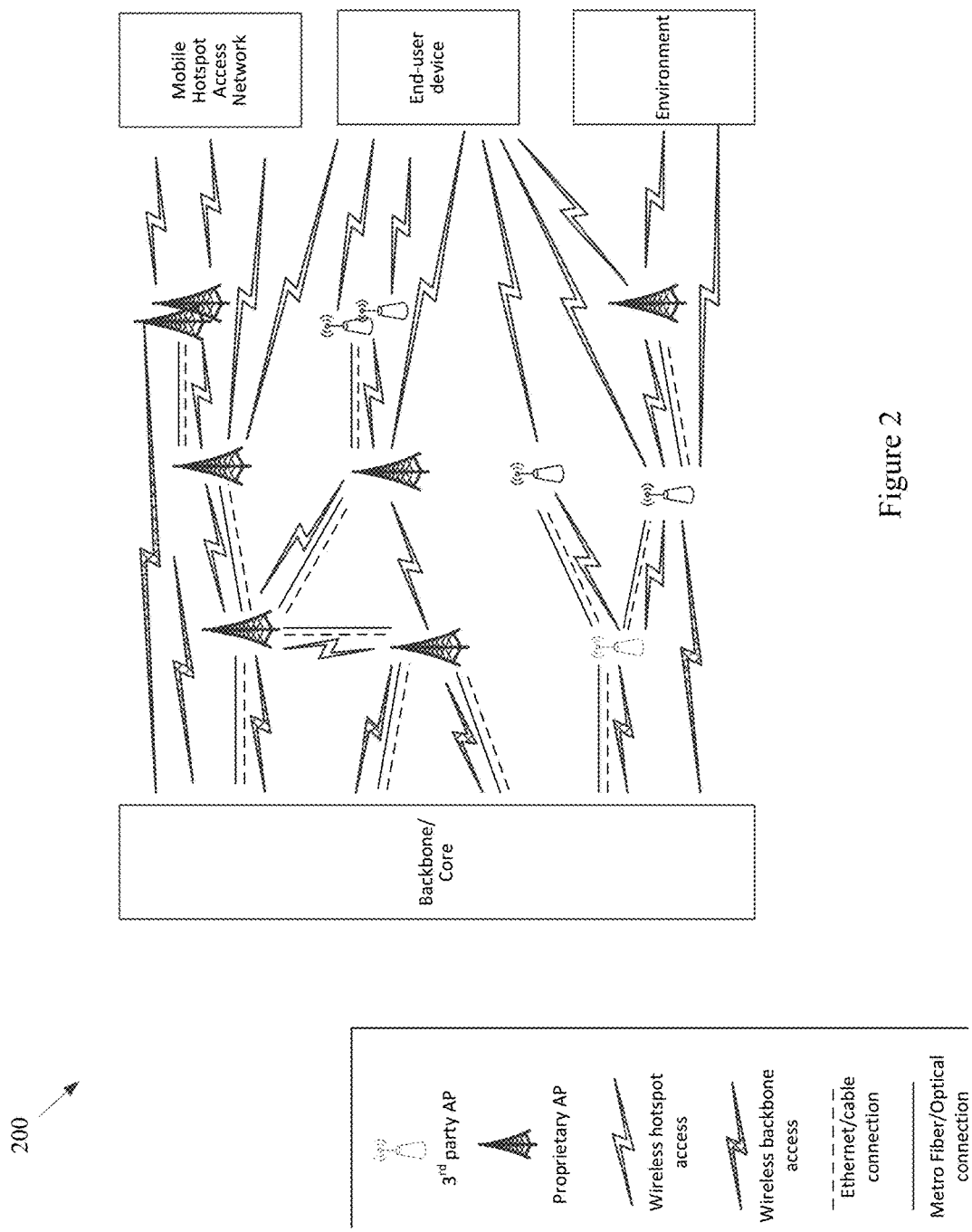
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
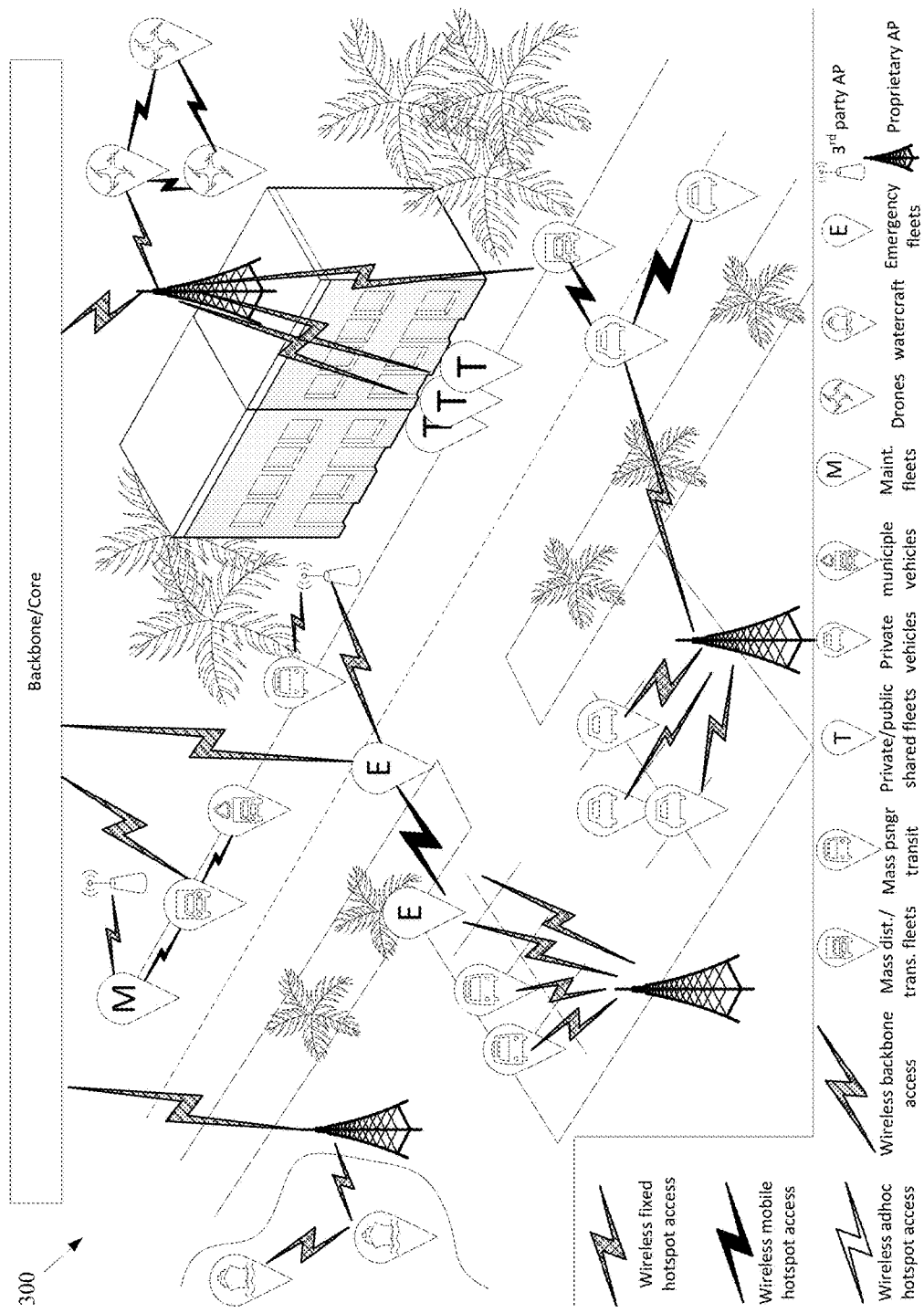
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
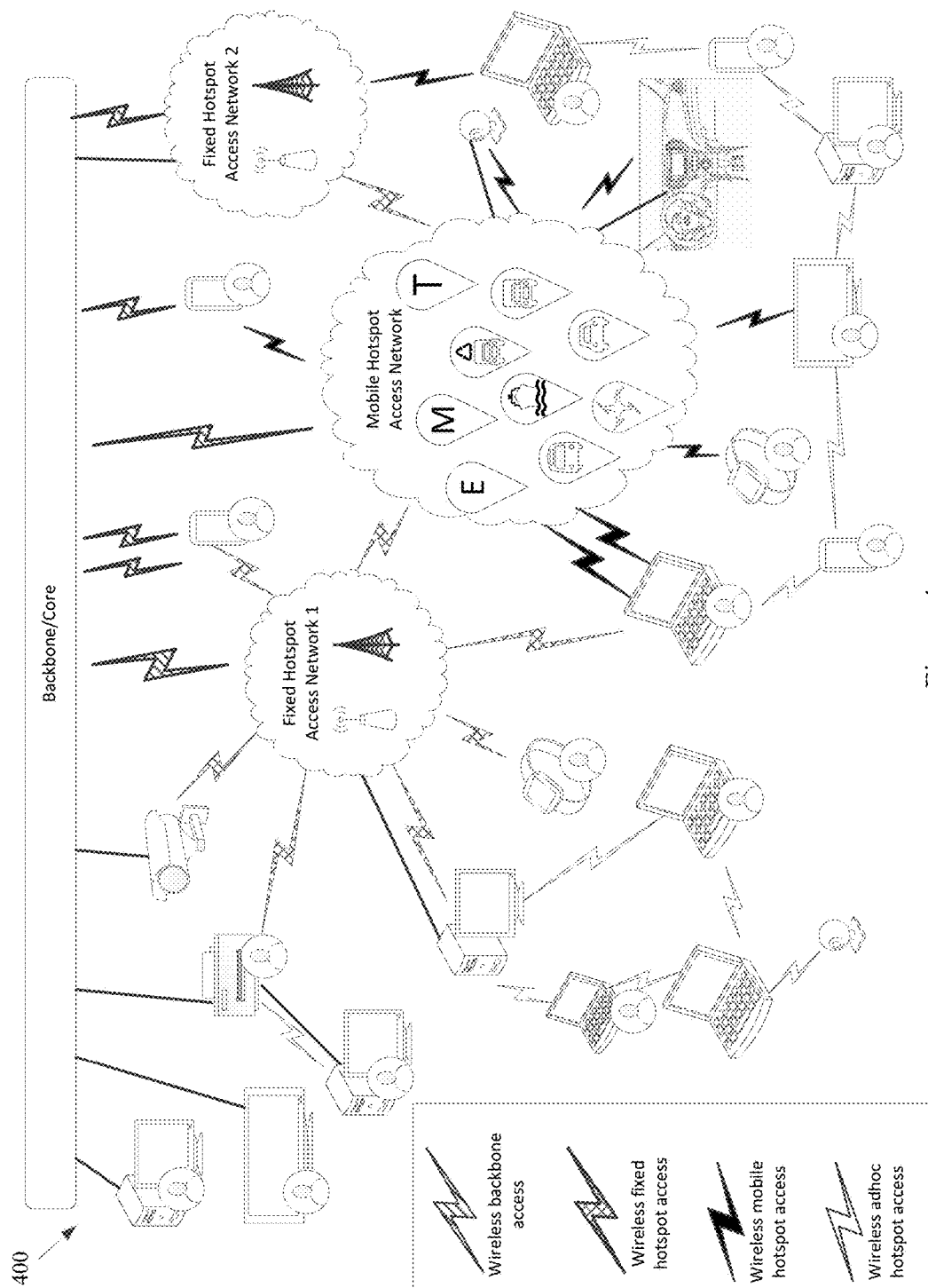
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
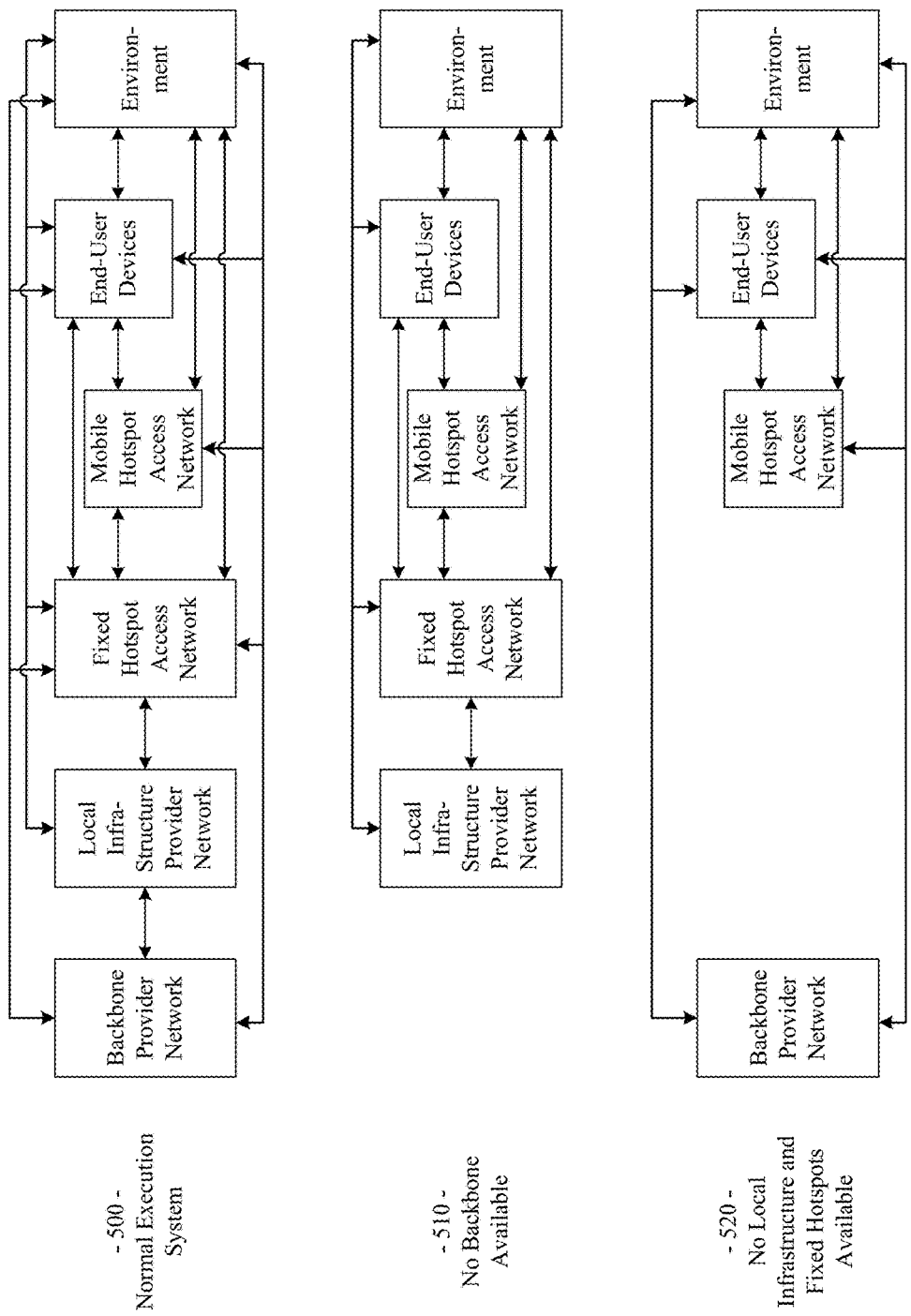
FIGS. 5A-5C show a plurality of network configurations illustrating the flexibility and/or and resiliency of a communication network, in accordance with various aspects of this disclosure.
Figure 5B:
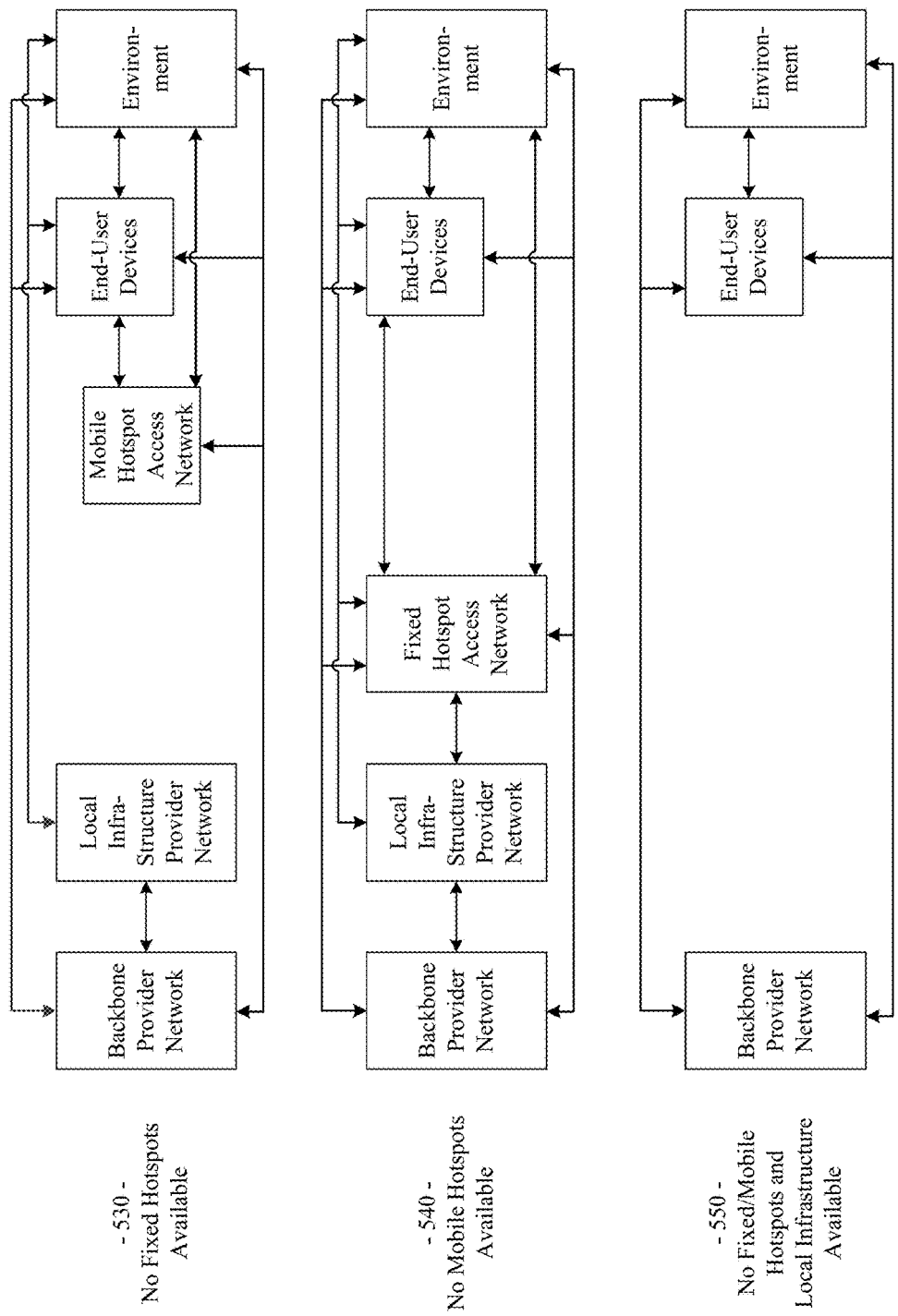
Figure 5C:
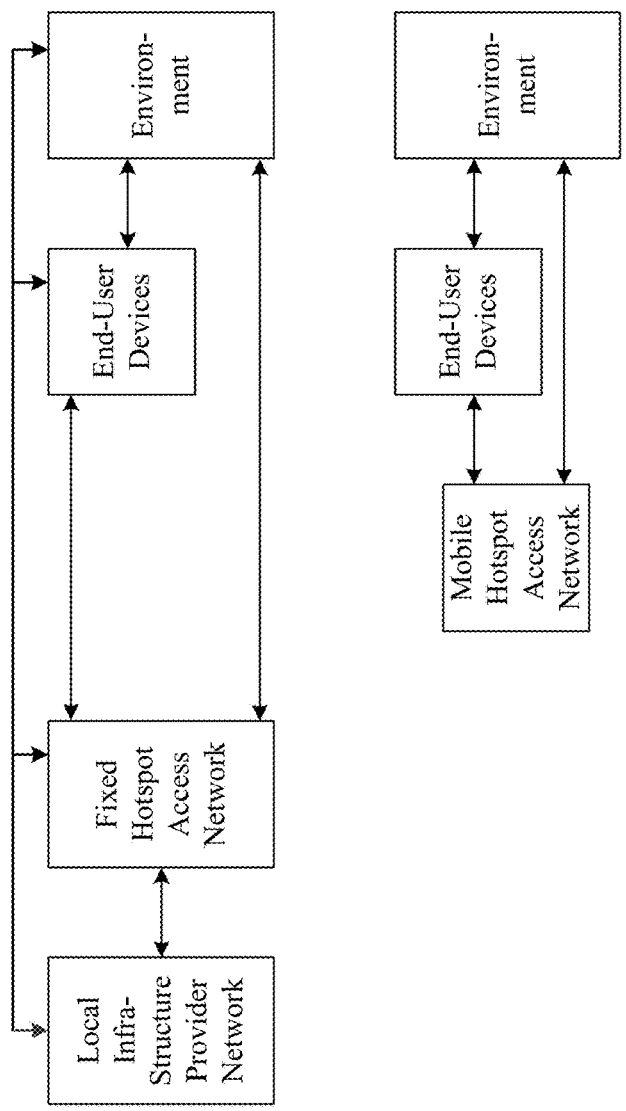

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
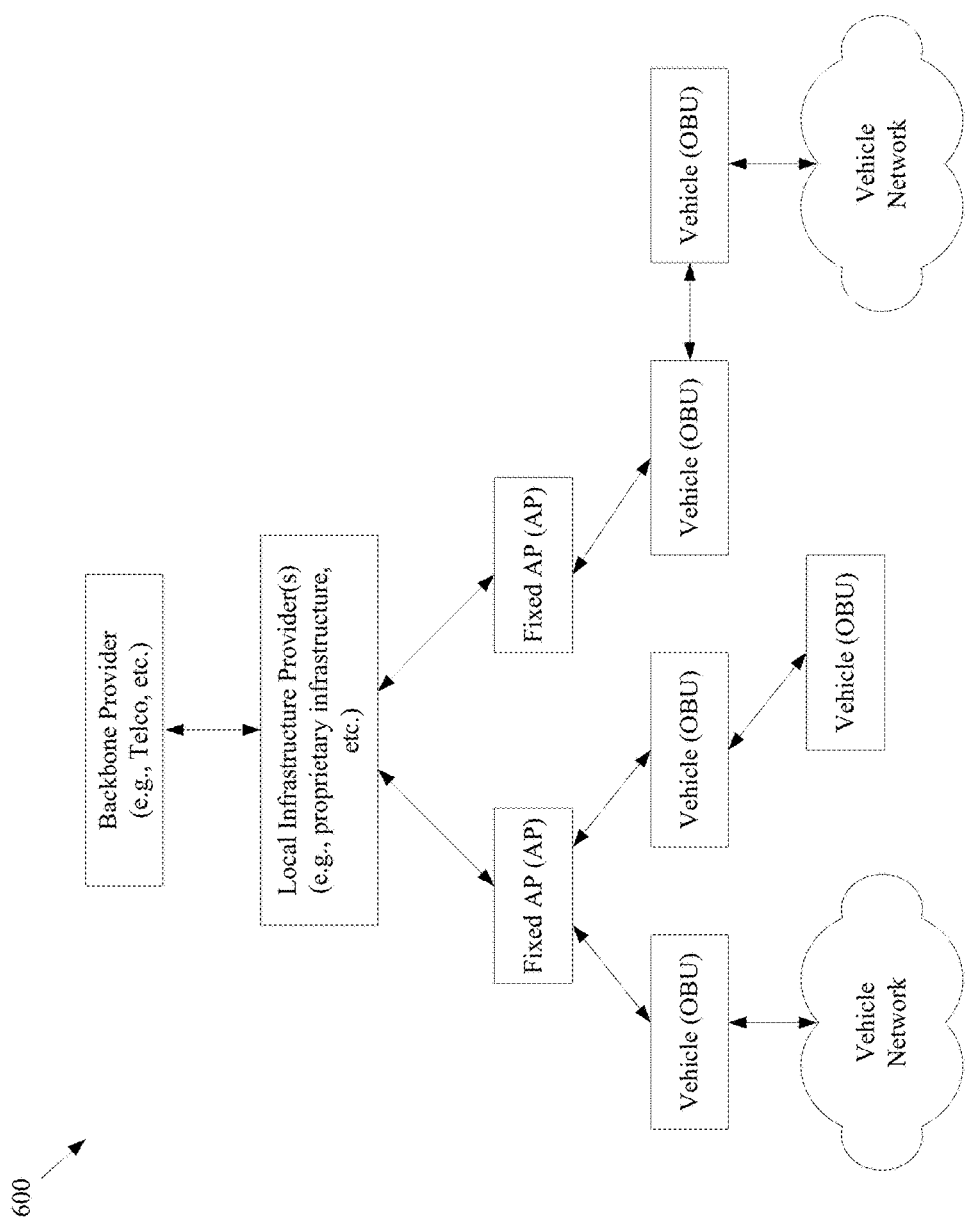
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

A network of moving things in accordance with various aspects of the present disclosure may employ a scalable and dynamic system that supports authentication, authorization, and accounting (AAA), to enable the network to have control over network nodes that use mobile and intermittent networks, services, and resources. With regard to AAA, the present disclosure may be focused primarily on the functionalities and mechanisms related to Authentication. Further details certificate management may be found, for example, in U.S. Provisional Application Ser. No. 62/430,634, titled "Systems and Methods for Self and Automated Management of Certificates in a Network of Moving Things, for Example Including a Network of Autonomous Vehicles," filed on Dec. 6, 2016, and in U.S. patent application Ser. No. 15/787,933, titled "Systems and Methods for Self and Automated Management of Certificates in a Network of Moving Things, for Example Including a Network of Autonomous Vehicles," filed on Oct. 19, 2017, each of which is hereby incorporated herein by reference in its entirety for all purposes.

Most end-users that access the Internet while traveling in a moving vehicle do so using a smartphone, although some end-users may employ a laptop or tablet computer equipped with, for example, cellular (e.g., 3G, 4G, Long Term Evolution (LTE), 5G, Global System for Mobile Communication (GSM), Code Division Multiple Access (CDMA), or other cellular air interface) or Wi-Fi (e.g., IEEE 802.11 a/b/g/n/ac/ad/af). Many of the electronic devices used by end-users have a large array of sensors which provide useful insights about the end-users of such devices and their surroundings. Such sensors include, by way of example and not limitation, accelerometers, magnetometers/compasses, gyroscopes, barometers, light sensors, global navigation satellite system (GNSS)/Global Positioning System (GPS) receivers, and one or more microphones.

Some of the sensors that are present in end-user devices may complement sensors already present in system(s) (e.g., an on-board unit (OBU) or navigation system) of the vehicle in which the end-user is traveling (e.g., accelerometer, GNSS/GPS), while others sensors may be configured to collect information unique to each end-user device (e.g., light sensor, barometer, gyroscope, proximity sensor). Some on-board sensors and/or sensors of an end-user device may, for example, be configured to measure the distance to a specific obstacle, vehicle, and/or spot nearby. In accordance with various aspects of the present disclosure, information received by, for example, an OBU of a vehicle, from one or more sensors of each of one or more electronic devices of end-user(s) that are passengers on the vehicle may, for example, be used to determine the conditions in various locations within the vehicle. Such information collected from the sensor(s) of end-user devices may, for example, be combined (e.g., in the OBU or other vehicle system) to create a more complete picture of the conditions inside the vehicle in/on which the end-user is riding, and may provide valuable insights about the usage pattern/profile of the end-user to, for example, an operator of a network as described herein, or third parties such as, for example, the manufacturer(s) of the end-user device(s), the manufacturer(s) of the vehicles in which the end-user is a passenger, and many other parties.

In accordance with various aspects of the present disclosure, multiple sources of the same type of information may be used to provide more accurate information or to correct errors (e.g., in GNSS/GPS-based position estimates). For example, information from separate sensors (e.g., GNSS/GPS receivers, accelerometers, gyroscopes, etc.) present in/generated by respective end-user device of a collection of end-user devices in proximity to one another (e.g., within a certain physical distance, traveling on the same vehicle) may be combined by, for example, a system of the vehicle which the end-users are sharing or a cloud-based system located remotely from the vehicle, to produce combined/corrected sensor information.

For example, respective electronic devices of two or more end-users that are located on opposite sides of, for example, a tour bus, may each have GNSS receivers that are currently unable to compute a fix due to an insufficient number of "visible" satellites at their physical location (e.g., due to the blockage of signals from satellites that may be visible to receivers on the other side of the vehicle). Electronically sharing with other end-user devices or systems of the vehicle, information about satellite signals that are visible to each end-user device such as, for example, satellite identifiers (e.g., satellite vehicle number (SVN), pseudorandom noise (PRN)), corresponding pseudo-ranges, ephemeris, correction, and other information for visible satellites that may be useful in calculating a receiver position, may enable some or all of the end-user devices to determine respective position information using the shared information, where none of the end-users devices were able to determine such position information on their own due to insufficient satellite signal information. It should be noted that in accordance with various aspects of the present disclosure, any geo-location-capable electronic device of an end-user may share information from a GNSS receiver or other sensors that may, or may be used to determine a current geographic location (e.g., latitude/longitude) of the electronic device of the end-user or of electronics devices of other end-users, where such shared information may comprise various information as discussed above, up to and including a position fix calculated by the sharing electronic device using information of its own sensors or including that shared by other electronic devices via a sharing mechanism such as that described herein.

Such corrected, merged, aggregated, and/or synergistic sensor information may be made available to the end-user devices of the passengers of the vehicle. In accordance with aspects of the present disclosure, the sensor information from different end-user devices may be made accessible (e.g., from a system of the vehicle or an end-user device in or near the vehicle, that is in communication with the different end-user devices on or near the vehicle) and may be shared locally with and/or between one, more than one, or all end-user device(s) e.g., in the same vehicle, within a certain physical distance, etc. In accordance with some aspects of the present disclosure, such combined/corrected/merged sensor information may be shared with those outside of the vehicle in which the sensor information was collected. For example, such sensor information may be useful in performing post hoc analysis of events on the vehicle such as, for example, providing valuable information about the dynamics and occurrence of vehicle crashes, about the degradation of various wireless communication or other services, about the comfort (e.g., based on accelerations due to road and/or vehicle conditions) of the occupants during travel, depending upon the array of sensor types available on the end-user devices of passengers. In addition, by combining traffic usage and sensor information from the same end-user device, a system in accordance with aspects of the present disclosure may be able to infer that the end-user device is being actively used by the end-user, or that end-user device activity is simply due to, for example, applications in the end-user device synchronizing information in the background (and not necessarily related to end-user activity with the device.

A system in accordance with various aspects of the present disclosure may gather sensor information such as that described above, from some or all end-user devices that have the ability to access the Internet from within a vehicle. Such a system may employ a captive portal, which may request end-user user permission to gather such sensor information from their end-user device, and the system may be configured to combine data from one or more sensors located in one or more end-user devices within the vehicle. A system according to aspects of the present disclosure may provide for access, by end-user devices, to aggregated/combined/synergistic and/or processed sensor data from some or all of the end-user devices within the vehicle, and may also provide a mechanism through which all sensor information acquired from end-user devices is sent to an online server for post hoc analysis of the acquired sensor data. In addition, a system in accordance with aspects of the present disclosure may provide a mechanism to remotely configure the way sensor information is collected from end-user devices with regard to various aspects such as, by way of example and not limitation, the types/kinds of sensors from which data is collected, the rate at which samples of various end-user device sensor information is collected, the amount of end-user device sensor information that is collected, the granularity of end-user device sensor samples, the periods of time (e.g., day-of-week, calendar date, time-of-day, etc.) at or during which end-user device sensor information is collected, and other parameters relevant to the collection of sensor data from end-user devices.

Figure 7:
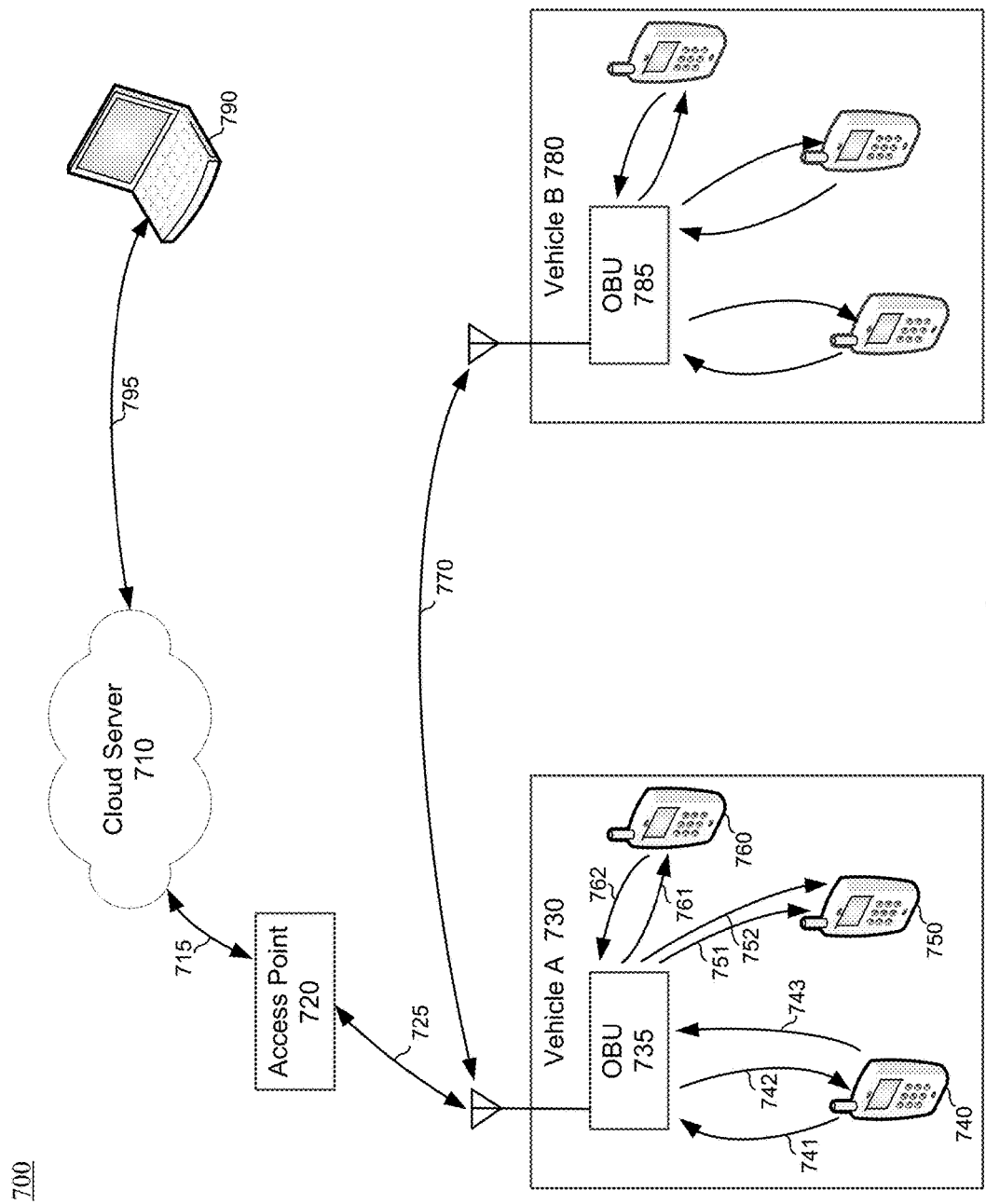
FIG. 7 shows a block diagram illustrating an example network that supports collection of sensor data from end-user devices such as, for example, electronic devices of passengers of vehicles, in accordance with various aspects of the present disclosure.

FIG. 7 shows a block diagram illustrating an example network 700 that supports collection of sensor data from end-user devices such as, for example, electronic devices of passengers of vehicles, in accordance with various aspects of the present disclosure. The example network of FIG. 7 includes a cloud server 710, a wireless access point 720, a vehicle A 730 that includes an OBU 735, a vehicle B 780 that includes an OBU 785, and a communication device 790. The cloud server 710, wireless access point 720, and OBUs A 735 and B 785 may, for example, correspond to elements of FIGS. 1 through 6 having the same or similar functionality including, for example, the cloud of network 100, the fixed wireless access points of FIG. 1 or 6, and the OBUs of FIG. 6, respectively.

The cloud server of a network according to aspects of the present disclosure, such as the example cloud server 710 of FIG. 7, may comprise one or more processors that execute instructions that collect and store information from sensors of communication devices of end-users such as, for example, the end-user devices 740, 750, 760 within wireless communication range of the OBU 735 of vehicle A 730, and the similarly represented wireless end-user devices served by the OBU 785 of vehicle B 780. The cloud server 710 communicates with the end-user devices 740, 750, 760 via communication link 715, access point 720, communication link 725, and OBU 735, to receive sensor data collected from end-user devices and stored at the OBUs 735, 785. The access point 720 may be, for example, what is referred to herein as a fixed AP, and the communication link 715 may comprise a wired and/or wireless communication link such as, for example, a wired or wireless connection to an Internet service provider or telecommunication services provider (e.g., telco, cable-based data services provider, and/or other data communication service as described herein). The communication link 725 may, for example, be a wireless communication path using the Dedicated Short Range Communication (DSRC) (e.g., IEEE 802.11p) protocol or a Wi-Fi (e.g., IEEE 802.11a/b/g/n/ac/ad/af) compatible wireless connection. In a similar fashion, the cloud server 710 communicates with end-user device(s) served by the OBU 785 via a communication link 770 that couples the OBU 785 with the OBU 735, enabling communication of data collected from the end-user devices of the passengers of vehicle B 780 and stored at the OBU 785. The communication of such sensor information from the OBU 785 to the OBU 735, and from the OBU 735 to the access point 720 may, for example, employ an opportunistic communication methodology that is delay tolerant, communicating data from a source OBU to a destination OBU or AP when establishment of a wireless communication link is possible and the opportunity to communicate sensor and/or other data between the source and destination devices become available. It should be noted that the communication methodology used for transfer of collected/processed sensor data from an OBU to a cloud-based system may be indicated by configuration information sent to the OBU by a cloud-based system. Additional details about various communication methodologies and delay tolerant networking approaches that may be used to communicate between elements in a network of moving things in accordance with various aspects of the present disclosure may be found, for example, in U.S. patent application Ser. No. 15/353,966, titled "Systems and Methods for Delay Tolerant Networking in a Network of Moving Things, for Example, Including a Network of Autonomous Vehicles," filed Nov. 17, 2016; in U.S. patent application Ser. No. 15/138,370, titled "Systems and Methods for Remote Configuration Update and Distribution in a Network of Moving Things," filed Apr. 26, 2016; and in U.S. patent application Ser. No. 15/157,887, titled "Systems and Methods for Remote Software Update and Distribution in a Network of Moving Things," filed May 18, 2016; the complete subject matter of each of which is hereby incorporated herein, by reference, in its respective entirety for all purposes.

The OBU 730 may comprise wireless access point functionality that provides Wi-Fi wireless communication between the end-user devices 740, 750, 760 and OBU 730 using, for example, a Wi-Fi wireless protocol according to IEEE 802.11a/b/g/n/ac/ad/af, as previously discussed above. The OBU 785 may provide similar access point functionality to the end-user device(s) within wireless communication range of OBU 785. In accordance with some aspects of the present disclosure, captive portal functionality of the OBU 735 may provide one or more web pages to an end-user device that is served by the OBU 735, which when displayed on a web browser of the end-user device may gather information from sensors of the end-user device In accordance with other aspects of the present disclosure, an end-user may install a mobile application, also referred to herein as a "mobile app," on the end-user device, which may gather and transmit end-user device sensor information to the OBU 735. End-user devices may include, for example, smart phones, tablet and laptop computers, and any other Wi-Fi enabled device having one or more sensors. In addition, functionality of the OBU 735 may provide a collection of application program interfaces (APIs, e.g., web APIs) that enable application and system software running on the end-user devices (e.g., 740, 750, 760) to collect and access the sensor information collected, processed, and stored locally by the OBU 735. The end-user device sensor information received by the OBU may then be sent to a cloud-based system such as cloud server 710, via a wireless access point such as the access point 720 of FIG. 7, using a delay tolerant communication mechanism.

In accordance with various aspects of the present disclosure, the end-user may, upon entering the vehicle, initiate a wireless connection between his/her electronic device and the wireless (e.g., Wi-Fi) network supported by the access point of the OBU (e.g., OBU 735 of FIG. 7). A web browser software application of the end-user device may be redirected to a "splash page" of a captive portal provided by a wireless access point of the OBU. This initial webpage sent by the OBU may, for example, display (e.g., in a "pop-up window") a request to access sensor information of the end-user device that initiated the wireless connection with the access point. The end-user may, for example, be required to accept the request before any sensor information is retrieved from their end-user device. In accordance with this approach, the web page displayed by the end-user device after the end-user approves access to sensor information of their electronic device may remain open for the duration of the Wi-Fi session, while one or more software component(s) of the web page (e.g., a program portion of the web page written using a scripting language such as, for example, JavaScript®, or using another suitable approach) may direct the OBU (e.g., OBU 735) to collect data from the various sensors available on the end-user device, and to process and store the collected sensor information for transmission to the cloud server (e.g., cloud server 710) via a nearby access point (e.g., access point 720).

In accordance with other aspects of the present disclosure, captive portal functionality of an OBU (e.g., OBU 735, 780) may prompt an end-user to install a "native" mobile application on their device from, for example, an "app store." The term "native" mobile application may be used herein to refer to an application program that has been developed for use on a particular type, model, or family of end-user device(s), or that comprises executable code that is run directly on one or more processors of such an end-user device. Such a mobile application may, as a "native" application, have the advantage of providing a greater degree of functionality, speed of operation, and/or control over the way sensor data is collected from the end-user device, and may have better, more complete APIs available. The "native" mobile application may operate independently of any other software applications (e.g., a web browser software application), and may not require that a particular web page be "open" or displayed when sensor data is being collected on the end-user device. In this approach, the "native" application may then communicate the collected and possible processed sensor data to a cloud-based system (e.g., cloud server 710) via an access point (e.g., access point 720) when the opportunity arises, as described above.

In accordance with various aspects of the present disclosure, an OBU (e.g., the OBU 735, 780) may collect and store sensor data information from one, more than one, or all wireless-enabled (e.g., Wi-Fi enabled) end-user devices within a vehicle or within a certain physical distance or wireless range. In accordance with some aspects of the present disclosure, the OBU may also provide an API through which any end-user device in the vehicle or within the physical distance or wireless range may access aggregated sensor data information collected from end-user devices in/on the vehicle, and stored in the OBU (e.g., OBU 735, 780) of the vehicle, and/or may access such information from a cloud-based system such as, for example, the cloud server 710 of FIG. 7.

In accordance with aspects of the present disclosure, the data collected from end-user devices by an OBU of a vehicle may be transmitted to a cloud-based system (e.g., cloud server 710) opportunistically, meaning that collected and stored sensor data may be transferred from the OBU to the cloud-based system whenever the OBU is within wireless communication range of an access point (e.g., access point 710). In this way, access to the sensor data collected from end-user devices of passengers in multiple vehicles within an area served by a network as described herein may be available to end-user devices and other devices/systems from a cloud-based system such as the cloud server 710, although such data may incur some delays which may be managed by the operator of the network by controlling parameters related to delays of an opportunistic communication methodology and delay tolerant network.

In accordance with aspects of the present disclosure, an OBU (e.g., OBUs 735, 780) may receive configuration information from a cloud-based system (e.g., cloud server 710 or other cloud-based system) regarding the collection of sensor data including, for example, the type of sensor data information to collect and store, a data/sampling rate for each type of sensor for which data is collected, a granularity for each sensor or sensor type, and/or a maximum amount of sensor data to collect (e.g., at the OBU), etc. The configuration information received by an OBU may, for example, be overridden locally by the OBU, depending on operating parameters or other information available locally, at the OBU. For example, if an OBU detects that the remaining capacity of a battery of a particular end-user device served by the OBU is below a particular threshold (e.g., "running low"), the OBU may reduce the data/sampling rate for sampling of data from one or more sensors of that end-user device to, e.g., reduce power consumption, despite the OBU having received configuration information representative of a higher data/sampling rate for that particular end-user device.

Figure 8A:
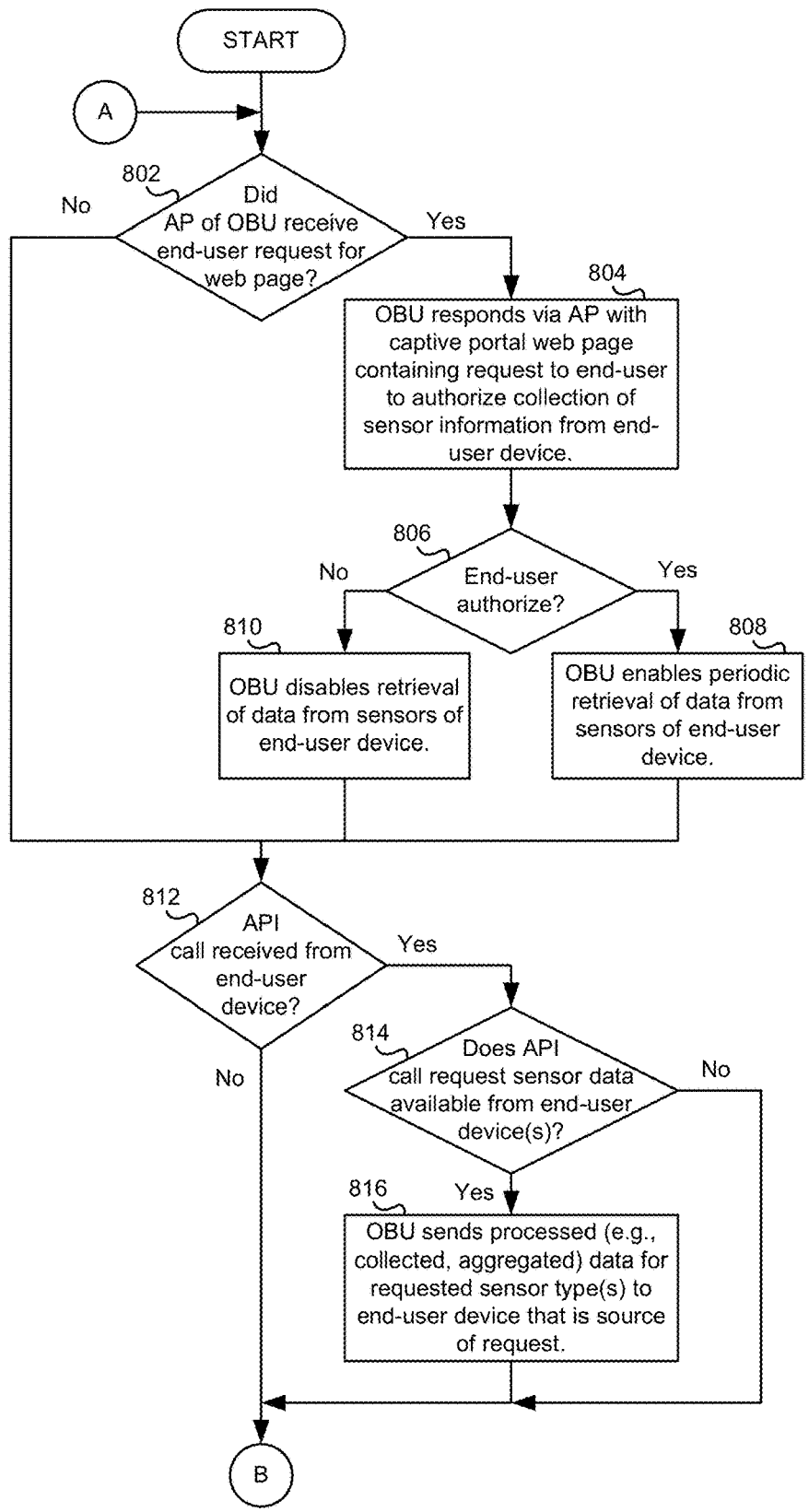
FIGS. 8A-8B show a flowchart for an example portion of a method of operating a network element supporting in-vehicle collection of data from sensors of end-user device via a captive portal, in accordance with various aspects of the present disclosure.
Figure 8B:
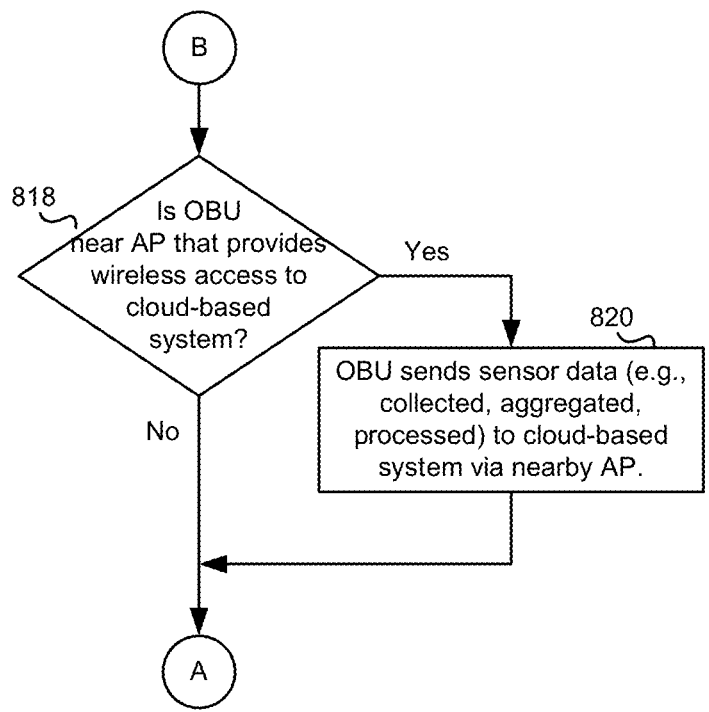

FIGS. 8A-8B show a flowchart 800 for an example portion of a method of operating a network element supporting in-vehicle collection of data from sensors of end-user device via a captive portal, in accordance with various aspects of the present disclosure. The network element performing the actions illustrated in FIGS. 8A-8B may be, for example, an on-board unit (OBU) located in a vehicle operating in a network of moving things as described herein. The OBU may correspond to, for example, the same or similar elements as described above with respect to and shown in FIGS. 1 through 7. The method of FIGS. 8A-8B may be performed by one or more processors of the network element (e.g., OBUs 735, 780), and the actions of the method may, when appropriate, be performed in a different order, and/or by separate threads and/or processes of the one or more processors, without departing from the spirit and scope of the present disclosure. The method of FIGS. 8A-8B begins at block 802.

At block 802, in accordance with some aspects of the present disclosure, the method may determine whether wireless access point functionality of the OBU has received a request for a web page from an electronic device of an end-user. As discussed above, such a request may, for example, be received by Wi-Fi access point functionality of an OBU, from a Wi-Fi enabled smart phone, tablet computer, and/or laptop computer of an end-user. The request for a web page may result from the detection, by software (e.g., a software "app") running on the end-user device, of wireless (e.g., Wi-Fi (e.g., IEEE 802.11a/b/g/n/ac/ad/af), or another local or short-range wireless communication standard) signals of a Wi-Fi enabled access point that is part of an OBU in a vehicle of a network of moving things. If, at block 802, it is determined that the AP of the OBU did not wirelessly receive a request for a web page from an end-user device, then the method may proceed to block 812, described below. If, however, it is determined, at block 802, that the AP of the OBU did wirelessly receive a request for a web page from an end-user device then, at block 804, the OBU may respond via the wireless AP with an initial web page. The initial web page provided by such an access point may be what is referred to herein as a "splash page" of a captive portal, which may be the first page that the end-user may view, and such a web page may control access by the end-user to any additional screens/pages accessible via the wireless AP such as, for example, Internet web pages, OBU functionality, and/or services that may be available via the AP. In the example method of FIGS. 8A-8B, in response to the web page request, the OBU may, at block 804, respond with a captive portal web page that, when displayed on a display screen of the end-user device, presents a request to the end-user to authorize the collection of sensor information from the electronic device of the end-user. The method then continues at block 806.

At block 806, the network element performing the method may determine whether the end-user has responded by authorizing the collection of sensor information from the electronic device of the end-user. If it is determined, at block 806, that the end-user did not authorize the collection of sensor data from the electronic device of the end-user, the method may, e.g., as a precaution, disable retrieval of data from sensors of the end-user device for transmission to an outside system (e.g., the OBU or cloud-based system). If, however, it is determined, at block 806, that the end-user did authorize the collection of data from one or more sensors of their electronic device, the method may then proceed to block 808, where the network element (e.g., OBUs 735, 780) may enable periodic retrieval/collection of data from the one or more sensors of the end-user device. The end-user may, for example as part of the authorization of collection of sensor data, be provided an opportunity to select for which of the sensors of their electronic device sensor readings and/or sensor information will be shared with the OBU, including how often samples may be collected, and whether any information identifying or characterizing the electronic device or the end-user may be provided to the OBU. As discussed above, sensors of the electronic device(s) of an end-user may include, for example, accelerometers, magnetometers/compasses, gyroscopes, barometers, light sensors, global navigation satellite system (GNSS)/Global Positioning System (GPS) receivers, one or more microphones, and/or any other sensor of an electronic end-user device as described herein. At that point, the OBU may begin capturing data samples and other information regarding the various sensors of the end-user device authorized by the end-user, in the manner allowed. As explained above, in accordance with aspects of the present disclosure, the end-user may also, at some point, be requested to identify from/about which sensors of the end-user device data samples/information may be collected, thereby affording the end-user with a range of control. Such identification of allowable capture/retrieval of sensor data may also, or alternatively, be provided in configuration information sent to the end-user device from a cloud based system. Whether or not end-user authorization is received, the method may then continue at block 812, described below.

At block 812, the method may determine whether a call to an application program interface (API) supported by the network element performing the method (e.g., OBU 735, 780) was received from an electronic device of an end-user (e.g., smart phone; tablet, notebook, laptop, or personal computer. etc.). Such an API call may, for example, be received from the end-user device via the wireless AP functionality of the OBU, or via another wireless interface such as, for example, a Bluetooth interface (e.g., IEEE 802.15.4) of the network element. If, at block 812, it is determined that an API call was received from an end-user device then the method may proceed to block 814, where the method may determine whether the received API call is requesting sensor data available from one or more end-user devices from which the network element (e.g., OBU 735, 780) is periodically collecting sensor data. If, at block 814, it is determined that the received API call is not requesting sensor data available from end-user devices from which the network element is periodically collecting sensor data, then the method may continue at block 818 of FIG. 8B, described below. If, however, it is determined at block 814, that the received API call is requesting sensor data that is available from end-user devices from which the network element is periodically collecting sensor data, the network element performing the method (e.g., OBU 735, 780) may then, at block 816, send processed data for the requested sensor type(s) to the requesting end-user device. In accordance with various aspects of the present disclosure, the API call requesting sensor data, or another API call, may specify, for example, the type(s) of sensor(s) from which data is being requested, the number of samples, a time period during which the sensor information was/will be collected, or other parameters that specify the nature of the sensor data being requested. The method of FIGS. 8A-8B may then continue at block 818 of FIG. 8B, described below.

At block 818 of FIG. 8B, the method may determine whether the network element (e.g., OBUs 735, 780) is near (e.g., within wireless communication range of) a wireless access point that provides wireless access to a cloud-based system for storing and later making available to various network elements and electronic devices of end-users, sensor data that has been collected from electronic devices of end-users via the various network elements (e.g., OBUs/MAPs, RSUs/FAPs) of a network of moving things, as described herein. The determination may be achieved by, for example, detection by the network element of certain wireless signals broadcast by the wireless access point. If, at block 818, it is determined that the network element is not currently near such a wireless access point, and therefore cannot transfer sensor data collected by the network element (e.g., OBUs 75, 780) from end-user devices (e.g., end-user devices 740, 750, 760 of FIG. 7) for storage and access at a cloud-based system, the method may proceed at block 802, described above. If, however, at block 818, it is determined that the network element is near a suitable wireless access point and is therefore able to transfer sensor data collected by the network element (e.g., OBUs 75, 780) from end-user devices (e.g., end-user devices 740, 750, 760 of FIG. 7) to a storage and access facility of a cloud-based system (e.g., cloud server 710), then the method of FIGS. 8A-8B may send the sensor data stored at the network element (e.g., OBU) to the cloud-based system (e.g., cloud server 710) via the nearby AP (e.g., OBU/MAP, RSU/FAP). The method may then continue at block 802, described above. It should be noted that, in accordance with various aspects of the present disclosure, the network element directly receiving and storing sensor information from the end-user device(s) may choose, in some situations based on configuration information received by the network element from, for example, a cloud-based system, or local configuration, to employ other communication options including, for example, transfer of the collected sensor information via a cellular network, if the urgency of receipt by the cloud-based system of the sensor data collected by the network element (e.g., OBU) warrants such cost. Such configuration information may indicate which types of sensor information are to be transferred to the cloud-based system, and the communication methodology (e.g., DIRECT, OPPORTUNISTIC, etc.) and wireless communication technology (e.g., Wi-Fi, DSRC, cellular) to be employed. Users of the collected sensor data transferred to the cloud-based system (e.g., data analysts and data scientists) may then access the data stored on the cloud-based system (e.g., cloud server 710) for post-hoc analysis. A system in accordance with aspects of the present disclosure may collect different sensor information from each end-user device, and may combine such sensor information to derive different metrics.

It should be noted that, in accordance with some aspects of the present disclosure, end-user permission(s) to collect sensor data from an end-user device may be solicited at each encounter with captive portals of network devices that support collection of sensor data, while in accordance with other aspects of the present disclosure, such permission information may, for example, be stored in the electronic device of the end-user, in the network device(s) to which the end-user provided permission to collect sensor data, or in a cloud-based system accessible to a plurality of network devices of a network of moving things within which the electronic device of the end-user may operate. Such permission information may, for example, be stored along with information that identifies an operator of the network device (s) that is authorized by the end-user to collect sensor data. In accordance with aspects of the present disclosure, once permission to collect various sensor data has been provided to a network device of an operator by an end-user, software (e.g., a captive portal software) running on other network devices of that same operator may be enabled to collect the sensor data permitted by the end-user, without further end-user authorization of collection. It should also be noted that, in accordance with some aspects of the present disclosure, data from sensors of an electronic device for which the end-user has granted permission(s) for access/collection of such sensor data may be requested by a network device from an electronic device of an end-user, based on the granted permission(s), as described herein, and in accordance with alternate aspects of the present disclosure, a software application running on the electronic device of the end-user may autonomously submit/transmit to a network device, based on the identity of the operator of the network device and the granted permission(s), the data from the sensors of the electronic device of the end-user for which permission(s) to access/collect was previously granted.

In accordance with aspects of the present disclosure, GNSS/GPS/geo-location or other sensor data from respective electronic devices of one or more end-users may complement the information from the GNSS/GPS receiver (i.e., sensor) or other kinds of sensors of a network element (e.g., OBUs 735, 780), enabling the system to achieve better positioning or sensing accuracy or by combining different GNSS/GPS information sources. In addition, coarse location information from one or more end-user devices may be used to get location information (e.g., latitude/longitude) or other sensed characteristics for areas where a network element (e.g., OBU) does not have GNSS/GPS signals/positioning or other sensor information available.

In accordance with various aspects of the present disclosure, the strength (e.g., RSSI) of a wireless (e.g., Wi-Fi, Bluetooth®) signal received by the network element (e.g., OBUs 735, 780) of a vehicle may permit the network element to determine an approximate location of the electronic device of the end-user inside of the vehicle in which the network element is located. This information may be combined with information from other sensors (e.g., accelerometers, gyroscopes, magnetometers/compasses, microphones, etc.) collected by the network element, to provide further information about the significance of the sensor data. For example, sensor information representative of vibration (e.g., one or more accelerometers) may be collected by a network element of a vehicle (e.g., an OBU/MAP) from respective electronic devices of one or more end-users, and such information may be used to determine whether the electronic devices of the end-users are being actively used, or are simply resting, for example, in the pocket of the end-user, in a backpack, or on a seat of a vehicle in which the end-users are riding. Differences in sensed vibration at different physical locations within the vehicle may, for example, be used to infer problems in the mechanical components of the vehicle, while vibrations/accelerations concurrently detected by two or more end-user electronic devices may be used to infer problems in the condition of the roadway being traveled by the vehicle in which the end-users are passengers. The use of sensor data collected from other types of sensors (e.g., microphones, light sensors, cellular radio transceivers, Bluetooth® radio transceivers, etc.) with which end-user devices (e.g., smart phones; tablet, notebook, laptop, and other personal computers, e-readers, etc.) may enable operators of a vehicle to detect patterns of performance of wireless coverage within the vehicle, a map of light levels within the vehicle, determine sound levels within the vehicle, etc.

In accordance with various aspects of the present disclosure, data/information representative of ambient light levels sensed by an end-user device may be used by one or more systems of the vehicle to aid in control of the interior lighting of the vehicle, thus saving energy in many situations. Such information may also be used as input to the detection of problems with the interior lighting systems of the vehicle.

In accordance with aspects of the present disclosure, information representative of a level of charge of a battery of an end-user device may be used to infer usage of the device. By monitoring/watching the level or degree of charge/remaining capacity, and/or changes in such a level or degree of charge/remaining capacity, systems analyzing such information may determine whether an end-user is using their device but is not accessing the Internet (e.g., with a higher level/degree of power consumption), which may indicate the presence of a problem with a data connection of the end-user device.

In accordance with various aspects of the present disclosure, data from an image sensor of a camera of an end-user device may be accessed, to periodically capture a photograph of environment of the user (i.e., what the end-user may be seeing). This sensor information may be useful in post-hoc analysis, such as, for example, following the occurrence of vehicle accidents or other incidents.

In accordance with various aspects of the present disclosure, sensor information from a proximity sensor (e.g., an infrared (IR) range sensor or IR reflectance sensor) sometimes used to detect whether a smart phone is placed upon the ear of the end-user to help in controlling the display or features of the end-user device, may be helpful in determining end-user activity. Sensor information from such a proximity sensor may, for example, be used to infer usage of the device and, again, may help determine whether the end-user device is in the pocket of the end-user, or resting on a table, seat, or floor.

In accordance with various aspects of the present disclosure, sensor information representing sound in the vicinity of the end-user device may be monitored to determine a sound level for the location and orientation of the end-user. Such information may be used to detect mechanical problems in the mechanical components of the vehicle, or problems in a vehicle sound system.

In accordance with various aspects of the present disclosure, data/information samples from the various types of sources (e.g., one or more sensors in one or more end-user devices in one or more vehicles within a network as described herein) may be combined at, for example, a cloud-based system (e.g., a cloud server 710) to provide valuable information about the status of a network of moving things. Such collected sensor information may also be combined with external information (e.g., traffic updates, weather reports, etc.) so that one may determine how end-user behavior and usage patterns are affected.

A system in accordance with the present disclosure permits a form of "crowdsourcing" of sensor information acquired from end-user electronic devices, instead of relying solely on one of one type of sensor in a network element like, for example, an accelerometer of an OBU. Such a system, by collecting sensor information from multiple instances of many different types of sensors of end-user devices extends the types of sensor information available and collected within a vehicle. By collecting sensor information from a variety of sensors of a population of end-user devices, a system in accordance with the present disclosure may act as a curator of sensor information from the end-user devices in the vehicle, and may thus make available to those end-user devices (via an API and wireless link), sensor information and information derived from the collected sensor information having a higher level or degree of completeness, quality, and accuracy. Such a system may use such sensor information to infer user and/or vehicle actions/behaviors, by monitoring sensors on the individual electronic devices of end-users, and may increase sensor coverage within a vehicle without deploying more sensors.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

Various aspects of the present disclosure may be seen in a method of operating a network device of a wireless network comprising a plurality of network devices configured to wirelessly communicate with one another Such a method may comprise establishing, by a first network device of the plurality of network devices, a wireless local area network that provides access to content or services via the first network device, by respective electronic devices of a plurality of end-users; and receiving, via the wireless local area network from a first electronic device of a first end-user of the plurality of end-users, one or more first messages that initiate access by the first electronic device to the content or the services of the first network device. The method may comprise sending one or more second messages representative of a user interface of a captive portal of the first network device to the first electronic device via the wireless local area network, wherein the one or more second messages cause the first electronic device to display the user interface that solicits the first end-user to authorize the first network device to access sensor data samples from one or more sensing devices in the first electronic device, and wherein the sensor data samples of each sensing device have a respective data type. The method may also comprise receiving respective sensor data samples from sensor devices of one or more electronic devices of the plurality of electronic devices via the wireless local area network, wherein the one or more electronic devices send the sensor data samples in accordance with respective end-user authorizations for the one or more electronic devices. The method may further comprise deriving combined information representative of one or more conditions of an environment in which the one or more electronic devices are located, wherein the combined information is derived using sensor data samples selected from the sensor data samples received from sensor devices of the one or more electronic devices, according to the one or more conditions and the respective type of the sensor data samples. Such a method may also comprise, responsive to receiving a request for information representative of a specified condition of the one or more conditions and a specified environment in which the one or more electronic devices are located, transmitting to an originator of the request, combined information derived according to the specified condition and the specified environment.

In accordance with various aspects of the present disclosure, the user interface may restrict the first electronic device from accessing the content and the services of the network device until the first end-user performs a designated action. The network device may be carried by a vehicle configured to move about a coverage area of the wireless network, and the services of the network device may comprise providing wireless Internet access to the plurality of end-users via the wireless local area network. The environment may comprise one of a geographic region or a vehicle. The one or more conditions may comprise one of the following: comfort of one or more occupants of a vehicle, a physical condition of a road traveled by a vehicle, and a physical location of an occupant of a vehicle. The type of sensor data samples may comprise a type representative of an acceleration data sample, a type representative of a physical location data sample, a type representative of a magnetic field data sample, and a type representative of a visible light intensity data sample. The at least one action may comprise granting authorization to the network device to access sensor data samples produced by one or more sensor devices of the first electronic device of the first end-user, and the one or more sensor devices may comprise a receiver for processing radio signals from satellites of a Global Navigation Satellite System.

Additional aspects of the present disclosure may be found in a non-transitory computer-readable medium on which is stored a plurality of code sections, wherein each code section comprises a plurality of instructions. The instructions may be executable by one or more processors to cause the one or more processors to perform the actions of a method of operating a network device of a wireless network comprising a plurality of network devices configured to wirelessly communicate with one another, and the actions of the method may be as in the method described above.

Further aspects of the present disclosure may be observed in a system for a network device of a wireless network comprising a plurality of network devices configured to wirelessly communicate with one another. The system may comprise, in a first network device of the plurality of network devices, one or more processors operably coupled to at least one wireless communication interface. The at least one wireless communication interface may be configurable to communicate with other network devices of the wireless network and to communicate with respective electronic devices of a plurality of end-users, and the one or more processors may be operable to, at least, perform actions of a method as described above.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a network device of a wireless network comprising a plurality of network devices configured to wirelessly communicate with one another, the method comprising:

establishing, by a first network device of the plurality of network devices, a wireless local area network that provides access to content or services via the first network device, by respective electronic devices of a plurality of end-users;

receiving, via the wireless local area network from a first electronic device of a first end-user of the plurality of end-users, one or more first messages that initiate access by the first electronic device to the content or the services of the first network device;

sending one or more second messages representative of a user interface of a captive portal of the first network device to the first electronic device via the wireless local area network, wherein the one or more second messages cause the first electronic device to display the user interface that solicits the first end-user to authorize the first network device to access sensor data samples from one or more sensing devices in the first electronic device, and wherein the sensor data samples of each sensing device have a respective data type;

receiving respective sensor data samples from sensor devices of one or more electronic devices of the plurality of electronic devices via the wireless local area network, wherein the one or more electronic devices send the sensor data samples in accordance with respective end-user authorizations for the one or more electronic devices;

deriving combined information representative of one or more conditions of an environment in which the one or more electronic devices are located, wherein the combined information is derived using sensor data samples selected from the sensor data samples received from sensor devices of the one or more electronic devices, according to the one or more conditions and the respective type of the sensor data samples; and responsive to receiving a request for information representative of a specified condition of the one or more conditions and a specified environment in which the one or more electronic devices are located, transmitting to an originator of the request, combined information derived according to the specified condition and the specified environment.

2. The method according to claim 1, wherein the user interface restricts the first electronic device from accessing the content and the services of the network device until the first end-user performs a designated action.

3. The method according to claim 1, wherein the network device is carried by a vehicle configured to move about a coverage area of the wireless network, and wherein the services of the network device comprise providing wireless Internet access to the plurality of end-users via the wireless local area network.

4. The method according to claim 1, wherein the environment one of a geographic region or a vehicle.

5. The method according to claim 1, wherein the one or more conditions comprise one of the following: comfort of one or more occupants of a vehicle, a physical condition of a road traveled by a vehicle, and a physical location of an occupant of a vehicle.

6. The method according to claim 1, wherein the type of sensor data samples comprises a type representative of an acceleration data sample, a type representative of a physical location data sample, a type representative of a magnetic field data sample, and a type representative of a visible light intensity data sample.

7. The method according to claim 1, wherein the at least one action comprises granting authorization to the network device to access sensor data samples produced by one or more sensor devices of the first electronic device of the first end-user.

8. The method according to claim 1, wherein the one or more sensor devices comprise a receiver for processing radio signals from satellites of a Global Navigation Satellite System.

9. A non-transitory computer-readable medium on which is stored a plurality of code sections, wherein each code section comprises a plurality of instructions executable by one or more processors to cause the one or more processors to perform the actions of a method of operating a network device of a wireless network comprising a plurality of network devices configured to wirelessly communicate with one another, the actions of the method comprising:

establishing, by a first network device of the plurality of network devices, a wireless local area network that provides access to content or services via the first network device, by respective electronic devices of a plurality of end-users;

receiving, via the wireless local area network from a first electronic device of a first end-user of the plurality of end-users, one or more first messages that initiate access by the first electronic device to the content or the services of the first network device;

sending one or more second messages representative of a user interface of a captive portal of the first network device to the first electronic device via the wireless local area network, wherein the one or more second messages cause the first electronic device to display the user interface that solicits the first end-user to authorize the first network device to access sensor data samples from one or more sensing devices in the first electronic device, and wherein the sensor data samples of each sensing device have a respective data type;

receiving respective sensor data samples from sensor devices of one or more electronic devices of the plurality of electronic devices via the wireless local area network, wherein the one or more electronic devices send the sensor data samples in accordance with respective end-user authorizations for the one or more electronic devices;

deriving combined information representative of one or more conditions of an environment in which the one or more electronic devices are located, wherein the combined information is derived using sensor data samples selected from the sensor data samples received from sensor devices of the one or more electronic devices, according to the one or more conditions and the respective type of the sensor data samples; and responsive to receiving a request for information representative of a specified condition of the one or more conditions and a specified environment in which the one or more electronic devices are located, transmitting to an originator of the request, combined information derived according to the specified condition and the specified environment.

10. The non-transitory computer-readable medium according to claim 9, wherein the user interface restricts the first electronic device from accessing the content and the services of the network device until the first end-user performs a designated action.

11. The non-transitory computer-readable medium according to claim 9, wherein the network device is carried by a vehicle configured to move about a coverage area of the wireless network, and wherein the services of the network device comprise providing wireless Internet access to the plurality of end-users via the wireless local area network.

12. The non-transitory computer-readable medium according to claim 9, wherein the environment comprises one of a geographic region or a vehicle.

13. The non-transitory computer-readable medium according to claim 9, wherein the one or more conditions comprise one of the following: comfort of one or more occupants of a vehicle, a physical condition of a road traveled by a vehicle, and a physical location of an occupant of a vehicle.

14. The non-transitory computer-readable medium according to claim 9, wherein the type of sensor data samples comprises a type representative of an acceleration data sample, a type representative of a physical location data sample, a type representative of a magnetic field data sample, and a type representative of a visible light intensity data sample.

15. The non-transitory computer-readable medium according to claim 9, wherein the at least one action comprises granting authorization to the network device to access sensor data samples produced by one or more sensor devices of the first electronic device of the first end-user.

16. The non-transitory computer-readable medium according to claim 9, wherein the one or more sensor devices comprise a receiver for processing radio signals from satellites of a Global Navigation Satellite System.

17. A system for a network device of a wireless network comprising a plurality of network devices configured to wirelessly communicate with one another, the system comprising:
    a first network device of the plurality of network devices, comprising:
        at least one wireless communication interface configurable to communicate with other network devices of the wireless network and to communicate with respective electronic devices of a plurality of end-users, and
        one or more processors operably coupled to the at least one wireless communication interface, the one or more processors being operable to, at least:
            establish, by the first network device, a wireless local area network that provides access to content or services via the first network device, by respective electronic devices of the plurality of end-users;
            receive, via the wireless local area network from a first electronic device of a first end-user of the plurality of end-users, one or more first messages that initiate access by the first electronic device to the content or the services of the first network device;
            send one or more second messages representative of a user interface of a captive portal of the first network device to the first electronic device via the wireless local area network, wherein the one or more second messages cause the first electronic device to display the user interface that solicits the first end-user to authorize the first network device to access sensor data samples from one or more sensing devices in the first electronic device, and wherein the sensor data samples of each sensing device have a respective data type;
            receive respective sensor data samples from sensor devices of one or more electronic devices of the plurality of electronic devices via the wireless local area network, wherein the one or more electronic devices send the sensor data samples in accordance with respective end-user authorizations for the one or more electronic devices;
            derive combined information representative of one or more conditions of an environment in which the one or more electronic devices are located, wherein the combined information is derived using sensor data samples selected from the sensor data samples received from sensor devices of the one or more electronic devices, according to the one or more conditions and the respective type of the sensor data samples; and
            responsive to receiving a request for information representative of a specified condition of the one or more conditions and a specified environment in which the one or more electronic devices are located, transmit to an originator of the request, combined information derived according to the specified condition and the specified environment.

18. The system according to claim 17, wherein the user interface restricts the first electronic device from accessing the content and the services of the network device until the first end-user performs a designated action.

19. The system according to claim 17, wherein the network device is carried by a vehicle configured to move about a coverage area of the wireless network, and wherein the services of the network device comprise providing wireless Internet access to the plurality of end-users via the wireless local area network.

20. The system according to claim 17, wherein the environment comprises one of a geographic region or a vehicle.

21. The system according to claim 17, wherein the one or more conditions comprise one of the following: comfort of one or more occupants of a vehicle, a physical condition of a road traveled by a vehicle, and a physical location of an occupant of a vehicle.

22. The system according to claim 17, wherein the type of sensor data samples comprises a type representative of an acceleration data sample, a type representative of a physical location data sample, a type representative of a magnetic field data sample, and a type representative of a visible light intensity data sample.

23. The system according to claim 17, wherein the at least one action comprises granting authorization to the network device to access sensor data samples produced by one or more sensor devices of the first electronic device of the first end-user.

24. The system according to claim 17, wherein the one or more sensor devices comprise a receiver for processing radio signals from satellites of a Global Navigation Satellite System.

* * * * *